United States Patent [19]

Price

[11] Patent Number: 4,584,933

[45] Date of Patent: Apr. 29, 1986

[54] ADJUSTABLE CONVEYOR TRACK FOR ICE CREAM SANDWICH MACHINE

[75] Inventor: Floyd W. Price, Freehold, N.J.

[73] Assignee: Burry-Lu, Inc., Elizabeth, N.J.

[21] Appl. No.: 674,203

[22] Filed: Nov. 23, 1984

[51] Int. Cl.$^4$ .............................................. A21C 9/04
[52] U.S. Cl. ............................... 99/450.4; 99/450.1; 99/450.7; 198/369; 198/370
[58] Field of Search ................. 99/450.1–450.7, 99/443 C, 644; 198/369, 370; 53/230; 426/275, 289; 425/308; 221/202, 205

[56] References Cited

U.S. PATENT DOCUMENTS

| | | | |
|---|---|---|---|
| 2,794,404 | 2/1957 | Rapp | 99/450.4 |
| 3,119,353 | 11/1964 | Roehn, Jr. | 99/450.4 |
| 3,316,860 | 4/1967 | Peterson . | |
| 3,340,992 | 9/1967 | Seragnoli . | |
| 3,576,189 | 4/1971 | Lorenz et al. . | |
| 3,655,025 | 4/1972 | Wilkin . | |
| 3,724,638 | 4/1973 | Peters et al. . | |
| 3,834,119 | 9/1974 | Armitt et al. | 53/230 |
| 3,880,751 | 4/1975 | Wirth . | |
| 4,004,681 | 1/1977 | Clewett et al. | 198/796 |
| 4,230,216 | 10/1980 | Wiens | 198/347 |

*Primary Examiner*—Timothy F. Simone
*Attorney, Agent, or Firm*—David A. Jackson; Daniel H. Bobis

[57] ABSTRACT

An ice cream sandwich machine includes an index wheel having a plurality of pockets for receiving ice cream sandwiches; and a conveyor assembly cooperating with the index wheel, comprising spaced endless conveyor chains having a plurality of lugs mounted thereon for removing the ice cream sandwiches from the pockets, and a conveyor track means for receiving the removed ice cream sandwiches, the conveyor track means including a fixed conveyor track formed by parallel, spaced, fixed guides connected together by a plurality of cross-bars and the fixed guides including free ends spaced from the index wheel to provide a drop-out zone for the removed ice cream sandwiches, an adjustable conveyor track formed by two parallel, spaced, adjustable guides having slots therein to provide slidable movement of the adjustable guides over the cross-bars and with respect to the fixed guides between a first position adjacent the index wheel for receiving the removed ice cream sandwiches and a second position spaced from the index wheel to expose the drop-out zone.

8 Claims, 4 Drawing Figures

ADJUSTABLE CONVEYOR TRACK FOR ICE CREAM SANDWICH MACHINE

BACKGROUND OF THE INVENTION

This invention relates generally to ice cream sandwich machines and, more particularly, is directed to an ice cream sandwich machine of the type in which an index wheel having a plurality of pockets therein transfers the formed ice cream sandwiches to a conveyor assembly.

Ice cream sandwich machines for automatically and continuously producing completed ice cream sandwiches are well known in the art, for example, as disclosed in U.S. Pat. Nos. 2,794,404; 3,119,353; 3,316,860; and 3,834,119.

In such machines, ice cream is extruded through the end of a vertically-oriented nozzle. At the same time, wafers stacked on inclined trays on opposite sides of the nozzle are continuously supplied to form with the extruded ice cream, ice cream sandwiches. The ice cream sandwich consisting of two wafers with extruded ice cream therebetween is formed and carried to an output conveyor by means of an index wheel positioned below the nozzle and having a plurality of pockets therein which receive the wafers and ice cream in the form of a sandwich.

The index wheel is intermittently rotated to position the ice cream sandwiches adjacent a conveyor assembly which carries the finished ice cream sandwiches to an ice cream sandwich wrapping assembly of the machine. Generally, lugs are secured to the conveyor assembly and communicate with the index wheel to engage and eject the ice cream sandwiches from the pockets of the index wheel. The sandwichs are thus caused to fall onto an endless conveyor belt of the conveyor assembly which is positioned immediately adjacent the index wheel.

Ideally, each formed ice cream sandwich should be of an identical configuration; that is, the wafers should be even with each other with ice cream centered in the middle thereof. However, due to various misalignments and the like in the ice cream sandwich machine, defective ice cream sandwiches may be formed, particularly during start-up and initial alignment of the machine. For example, the wafers may be off center with each other and/or with respect to the ice cream therebetween, the ends of the sandwich may be smashed or the ends of a wafer may be broken off.

In the case of defective ice cream sandwiches, as enumerated above, it is desirable that these sandwiches be quickly and readily removed from the machine prior to entering the wrapping assembly.

Although various ejecting conveyor assemblies are known, for example, as disclosed in U.S. Pat. Nos. 3,340,992; 3,576,189; 3,655,025; 3,724,638; 3,880,751; 4,004,681 and 4,230,216, each of these mechanisms is relatively complex and cannot easily and readily be used to eject defective ice cream sandwiches in an ice cream sandwich machine.

OBJECTS AND SUMMARY OF THE INVENTION

Accordingly, it is an object of the present invention to provide novel ice cream sandwich apparatus for easily and readily ejecting defective ice cream sandwiches.

More particularly, it is an object of the present invention to provide ice cream sandwich apparatus having a drop-out zone adjacent the index wheel for defective ice cream sandwiches.

It is another object of the present invention to provide ice cream sandwich apparatus having an adjustable conveyor from the index wheel to expose a drop-out zone for defective ice cream sandwiches.

In accordance with an aspect of the present invention, an ice cream sandwich making machine comprising a linearly extended horizontal base having an infeed end and a discharge end; a vertical support wall communicating with said base adjacent to said infeed end; a sandwich assembling station mounted on said vertical support and suspended above said infeed end; a sandwich indexing means located below said sandwich assembling station, comprising an indexing wheel means defining a plurality of circumferentially positioned pockets for receiving and transferring assembled ice cream sandwiches for horizontal conveyance; and conveyor assembly means located on said base and extending from said indexing means to said discharge end, said conveyor assembly means comprising movable conveyor means for receiving said sandwiches from said indexing wheel means and urging said sandwiches toward said discharge end, a plurality of lugs projecting from said conveyor means and adapted to cooperate with said indexing wheel means to engage and urge said sandwiches out of said pockets, and conveyor track means comprising a fixed conveyor track having a receiving end spaced from the index wheel to provide a drop-out zone for the removed ice cream sandwiches, and an adjustable conveyor track slidably reciprocable with respect to the fixed conveyor track between a first position adjacent the index wheel for receiving the removed ice cream sandwiches and a second position spaced from the index wheel to expose the drop-out zone.

The above, and other, objects, features and advantages of the present invention will become readily apparent from the following detailed description thereof which is to be read in connection with the accompanying drawings.

DETAILED DESCRIPTION OF A PREFERRED EMBODIMENT

Figure 1:
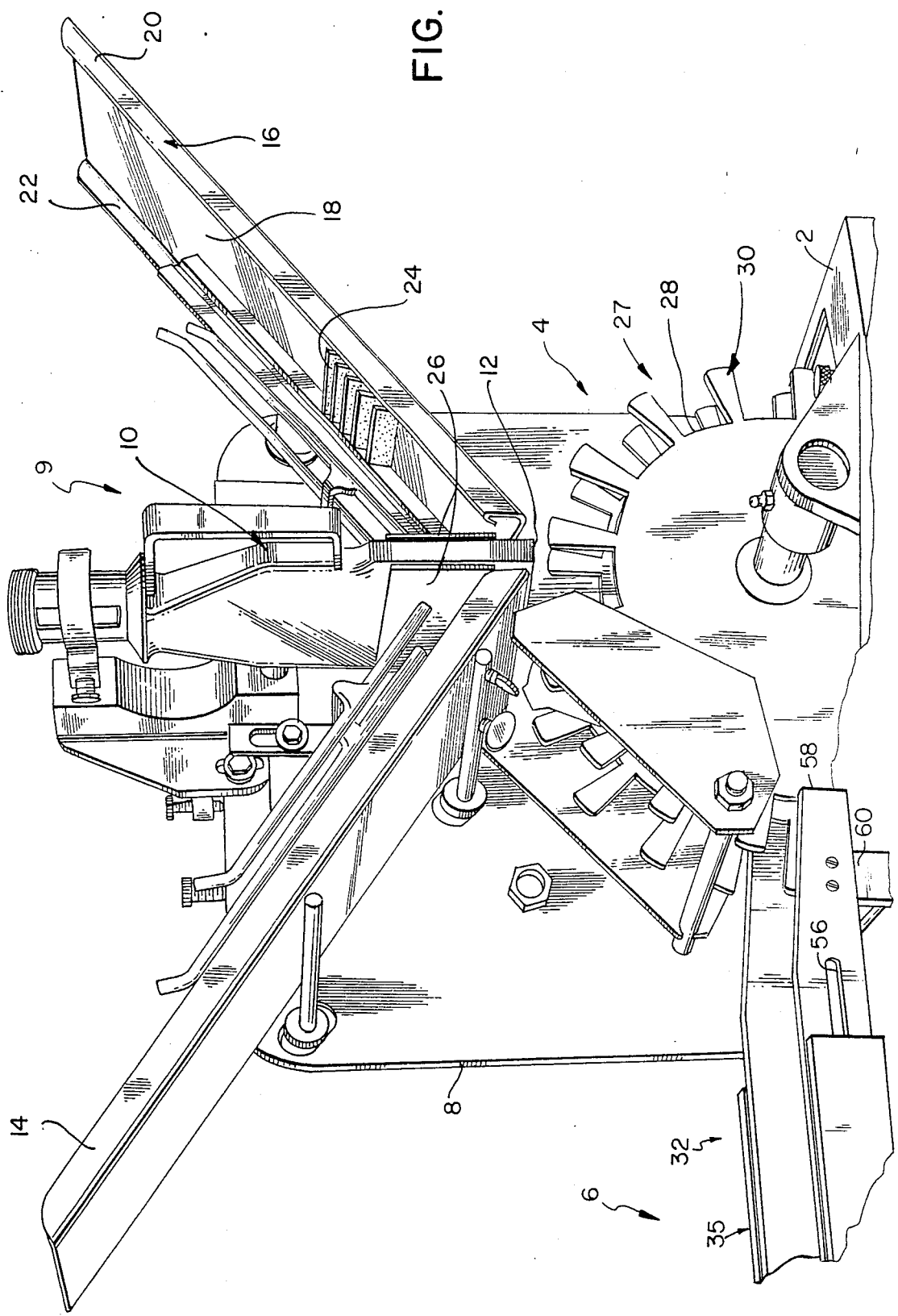
FIG. 1 is a perspective view of a portion of an ice cream sandwich machine according to the present invention.

Referring to the drawings in detail, and initially to FIG. 1 thereof, an ice cream sandwich making machine according to the present invention generally comprises a linear, horizontal base 2 having an infeed end 4 and a discharge end 6, and a vertical support wall 8 positioned adjacent to infeed end 4. A sandwich assembling station 9 is mounted on support wall 8 and is suspended above infeed end 4.

Assembling station 9 includes a nozzle 10 having an open end 12 through which ice cream is extruded. Wafer trays 14 and 16 are provided on opposite sides of nozzle 10 and each tray 14 and 16 is defined by a bottom wall 18 and side walls 20 and 22. The wafers 24 are stacked within trays 14 and 16.

As shown in the drawings, trays 14 and 16 are inclined downwardly toward nozzle 10 and terminate on opposite sides of nozzle 10 such that bottom walls 18 thereof are substantially coincident with open end 12 of nozzle 10 and with a space being provided between nozzle 10 and trays 14 and 16 to permit a single wafer to exit from trays 14 and 16 on opposite sides of nozzle 10.

A pair of pusher blades 26 are also positioned between trays 14 and 16 and nozzle 10 for pushing the wafers on adjacent sides of nozzle 10 downwardly into contact on opposite sides of the extruded ice cream. More particularly, pusher blades 26 are vertically reciprocated to bias the respective wafers down and into alignment with the opposite sides of the ice cream extruded from the end 12 of nozzle 10.

The ice cream sandwich making machine includes a sandwich indexing means 27 located vertically below sandwich assembling station 9, for receiving and transferring the assembled ice cream sandwiches. Indexing means 27 comprises an index wheel 30 that defines a plurality of regularly spaced, circumferentially positioned pockets 28 that in operation, are brought into consecutive vertical alignment with nozzle 10. Assembled ice cream sandwiches are thus urged downward by pusher blades 26 into respective pockets 28 of index wheel 30, as is conventional in the art. The ice cream sandwich formed in the respective pocket 28 is then carried by index wheel 30 to an output conveyor assembly 32.

Conventionally, output conveyor assembly 32 is located on base 2 and extends from indexing means 27 to discharge end 6. Assembly 32 comprises a movable conveyor means 33 which includes a pair of endless conveyor chains (not shown) on which spaced lugs are mounted. The conveyor chains extend over a pair of sprockets (not shown) mounted on shafts, one of which is adjacent the index wheel and the other of which is adjacent the wrapping assembly of the machine. As the chains move between the sprockets, the lugs are continuously moved therewith so as to bias or push out the ice cream sandwiches from the pockets of the index wheel onto the pair of fixed guides which form a fixed conveyor track on which the ice cream sandwiches are pushed by the lugs.

Figure 2:
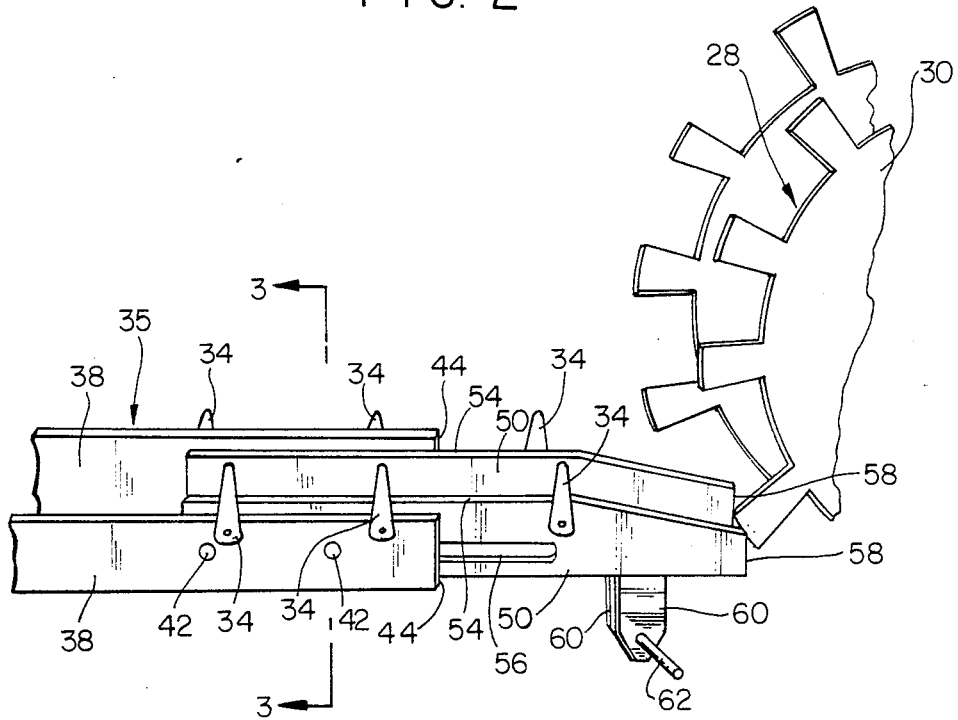
FIG. 2 is an enlarged perspective view of the conveyor assembly and index wheel of the ice cream sandwich machine of FIG. 1.
Figure 3:
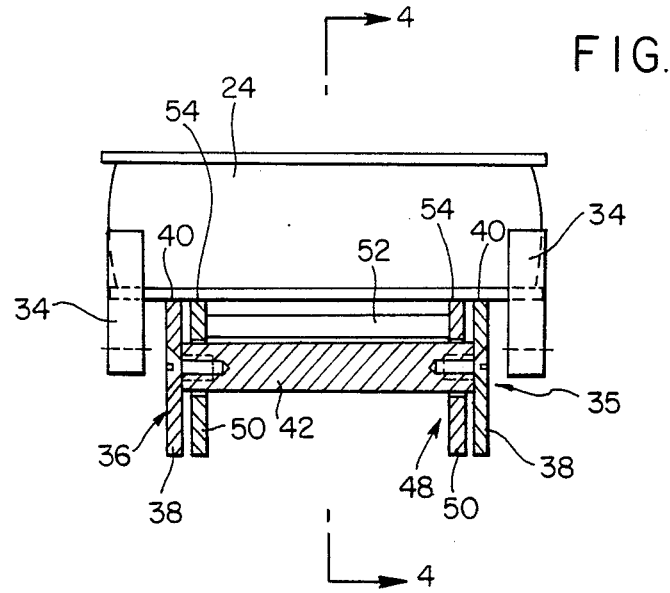
FIG. 3 is a schematic cross-sectional view of the ice cream sandwich machine of FIG. 2, taken along Line 3—3 thereof.
Figure 4:
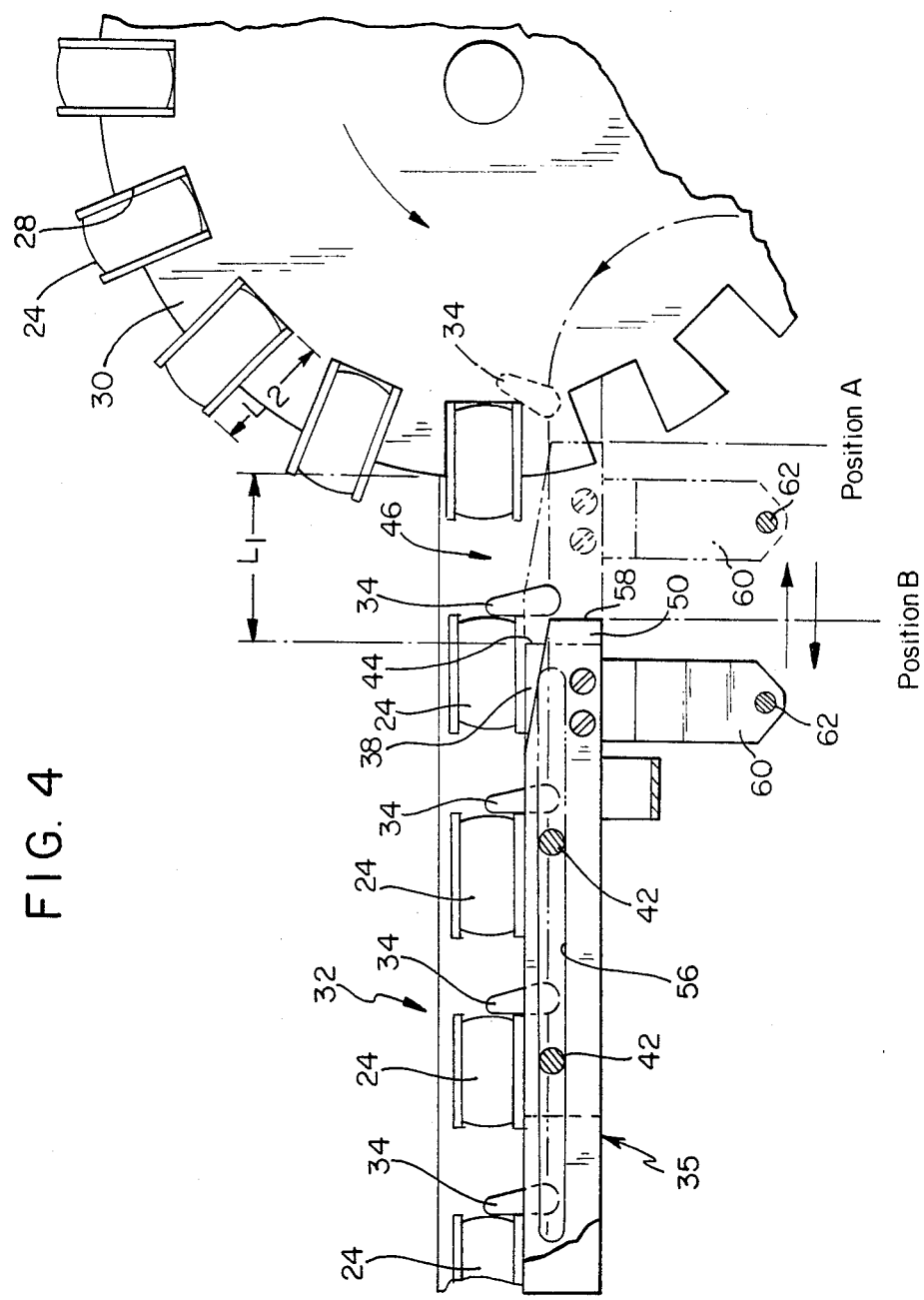
FIG. 4 is a schematic elevational view of a portion of the ice cream sandwich machine of FIG. 3, taken along line 4—4 thereof.

In accordance with the present invention and as illustrated herein in FIGS. 2-4, conveyor assembly 32 includes a plurality of lugs 34 fixedly secured on each of two spaced, parallel conveyor chains (not shown), in a similar manner to that shown in U.S. Pat. Nos. 2,794,404; 3,316,860; and 3,834,119. Lugs 34 are spaced so as to be positioned on opposite sides of index wheel 30. Since ice cream sandwiches 24 extend outwardly from both sides of index wheel 30, lugs 34 impact against the extending ends of the ice cream sandwich 24 then adjacent conveyor assembly 32, as shown in FIG. 4, to bias or push out the ice cream sandwich 24 onto conveyor assembly 32, as is conventional in the art.

Conveyor assembly 32 also includes a conveyor track means 35 that comprises a fixed conveyor track 36 formed by spaced, parallel guides 38 fixedly positioned between the conveyor chains and respective lugs 3 and which provide upper flat conveyor surfaces 40, respectively. Guides 38 are interconnected by parallel bars 42, as shown in FIGS. 3 and 4. Thus, as the conveyor chains continuously move along their endless paths, lugs 34 secured thereto remove ice cream sandwiches 24 from pockets 28 of index wheel 30 onto the spaced upper surfaces 40 of fixed conveyor track 36 and therealong until ejected from conveyor assembly 32 at the wrapping portion of the machine.

In accordance with the present invention, the free ends 44 of guides 38 are spaced from index wheel 30 by a distance $L_1$ to define a drop-out zone 46. Because the width $L_2$ of each ice cream sandwich 24 is less than the dimension $L_1$, the ice cream sandwiches 24 removed from pockets 28 of index wheel 30 by lugs 34 will normally fall into drop-out zone 46 and out of the machine.

In furtherance of the objects of the present invention, conveyor assembly 32 includes an adjustable conveyor track 48 having parallel, spaced guides 50 which are parallel to and spaced inwardly of guides 38. Adjustable guides 50 are interconnected by any suitable means, such as cross-bars 52, and the upper surfaces 54 of adjustable guides 50 are co-planar with the upper surfaces 40 of fixed guides 38.

Each adjustable guide 50 is further provided with a longitudinal slot 56 through which cross-bars 42 of fixed conveyor track 36 extend. As a result, adjustable conveyor track 48 is slidable along cross-bars 42 between a first position A in which the free ends 58 of adjustable guides 50 are adjacent index wheel 30 for receiving ice cream sandwiches 24 removed from pockets 28 thereof and a second position B in which the free ends 58 are spaced from index wheel 30 to expose the drop-out zone 46.

When adjustable conveyor track 48 is at position A, the ice cream sandwiches 24 removed from index wheel 30 drop onto upper surfaces 54 and are urged therealong by lug 34 onto the upper surfaces 40 of fixed conveyor track 36. On the other hand, when adjustable conveyor track 48 is at position B, there is a gap between free ends 44 and 58 of fixed conveyor track 36 and adjustable conveyor track 48, respectively, so as to expose drop-out zone 46, whereby ice cream sandwiches 24 removed from index wheel 30 fall into drop-out zone 46 and out of the machine.

As shown in FIGS. 2 and 4, upper surfaces 54 of adjustable guides 50 slope downwardly at the free ends thereof to provide an inclined surface. This incline aids in the conveying operation for transporting the removed ice cream sandwiches 24 to fixed conveyor track 36.

The sliding motion of adjustable conveyor track 48 with respect to fixed conveyor track 36 may be effected by any suitable means. For example, a downwardly extending lever 60 may be secured to one or both of guides 50 for controlling sliding movement thereof. A pin 62 can extend at right angles from levers 60 to be grasped by the operator for manually sliding adjustable conveyor track 48. Alternatively, a motor can be provided with associated gearing which can be operated by the mere pressing of a button for controlling the sliding movement of adjustable conveyor track 48.

In operation, and particularly during initial start-up of the machine, adjustable conveyor track 48 is in position A to receive the ice cream sandwiches 24 from index wheel 30 by lugs 34. In such position, the removed ice cream sandwiches 24 are transported from adjustable conveyor track 48 to fixed conveyor track 36 and then to the wrapping portion of the machine. If, during such operation, the operator detects a defective ice cream sandwich 24, at the time of removal thereof from its respective pocket 28 of index wheel 30, the operator, through lever 60 or other suitable means as aforementioned, controls adjustable conveyor track 48 to cause the latter to slide along cross-bars 42 to position B so as to expose drop-out zone 46. When the defective ice cream sandwich 24 is ejected from its respective pocket 28 at such time, the ice cream sandwich falls into drop-out zone 46, rather than being transported along adjustable conveyor track 48 or fixed conveyor track 36, and out of the machine. Adjustable conveyor track 48 is then returned to its original position A to receive the next ice cream sandwich. If the next ice cream sandwich is defective, adjustable conveyor track 48 is again moved to position B and the process is repeated.

Various modifications within the scope of the present invention as defined by the claims can be made by one of ordinary skill in the art. For example, return of adjustable conveyor track 48 from position B to position A can be performed automatically by a spring secured to lever 60, suitable electronic control circuitry for a motor or similar means.

Having described a specific preferred embodiment of the invention with reference to the acompanying drawings, it is to be understood that the present invention is not limited to that precise embodiment, and that various changes and modifications may be effected therein by one of ordinary skill in the art without departing from the scope and spirit of the invention as defined by the appended claims.

What is claimed is:

1. An ice cream sandwich machine comprising:
   A. a linearly extended horizontal base having an infeed end and a discharge end;
   B. a vertical support communicating with said base adjacent to said infeed end;
   C. a sandwich assembling station mounted on said vertical means suspended above said infeed end;
   D. a sandwich indexing means located vertically below said sandwich assembling station, comprising an indexing wheel defining a plurality of circumferentially positioned pockets for receiving and transferring assembled sandwiches for horizontal conveyance; and
   E. a conveyor assembly located on said base and extending from said indexing means to said discharge end, said conveyor assembly comprising,
   i. movable conveyor means for receiving said sandwiches from said indexing wheel and urging said sandwiches toward said discharge end,
   ii. a plurality of lugs projecting from said conveyor means and adapted to cooperate with said indexing wheel to engage and urge said sandwiches out of said pockets, and
   iii. conveyor track means disposed medially of said conveyor means, comprising a fixed conveyor track having a receiving end spaced from said index wheel to provide a drop-out zone for said removed ice cream sandwiches, and an adjustable conveyor track slidably movable with respect to said fixed conveyor track between a first position adjacent said index wheel for receiving said removed ice cream sandwiches and a second position spaced from said index wheel to expose said drop-out zone.

2. An ice cream sandwich machine according to claim 1; wherein said fixed conveyor track includes spaced, parallel guides, each having an upper surface for supporting said removed ice cream sandwiches.

3. An ice cream sandwich machine according to claim 2; wherein said lug means includes a plurality of lugs spaced apart on opposite sides of said fixed guides for removing said ice cream sandwiches from said pockets and transporting the removed ice cream sandwiches along the upper surfaces of said fixed guides.

4. An ice cream sandwich machine according to claim 2; wherein said fixed guides are spaced apart and connected to each other by at least one cross-bar; and said adjustable conveyor track includes parallel, spaced adjustable guides slidably movable along said at least one cross-bar.

5. An ice cream sandwich machine according to claim 4; wherein each of said adjustable guides includes a slot, and said at least one cross-bar is positioned within said slot.

6. An ice cream sandwich machine according to claim 5; wherein said adjustable conveyor track includes at least one cross-bar for connecting said adjustable guides together in a spaced apart relation.

7. An ice cream sandwich machine according to claim 5; further comprising means for slidably moving said adjustable conveyor track with respect to said fixed conveyor track between said first and second positions.

8. An ice cream sandwich machine according to claim 7; wherein said control means includes lever means secured to at least one of said adjustable guides for controllig sliding movement of said adjustable guides along said at least one cross-bar with respect to said fixed conveyor track.

* * * * *